(12) United States Patent
Guo et al.

(10) Patent No.: US 7,022,745 B2
(45) Date of Patent: Apr. 4, 2006

(54) PROCESS FOR FORMING SOLID PRESSURE SENSITIVE ADHESIVE POLYMER MICROSPHERES

(75) Inventors: Jong-Shing Guo, Longmeadow, MA (US); Augustin T. Chen, Cheshire, CT (US); Sharon D. Trembley, Chicopee, MA (US)

(73) Assignee: Surf Chip, Inc., Wilmington, DE (US)

( * ) Notice: Subject to any disclaimer, the term of this patent is extended or adjusted under 35 U.S.C. 154(b) by 0 days.

(21) Appl. No.: 10/272,409

(22) Filed: Oct. 15, 2002

(65) Prior Publication Data
US 2003/0096933 A1    May 22, 2003

Related U.S. Application Data

(60) Provisional application No. 60/332,305, filed on Nov. 13, 2001.

(51) Int. Cl.
*C08J 9/16*    (2006.01)

(52) U.S. Cl. .............................. 521/56; 521/60; 521/63; 521/64; 523/233; 524/801; 428/402

(58) Field of Classification Search ................ 524/853, 524/801; 521/64, 56, 60, 63; 523/223, 233; 526/307.1, 319; 428/402
See application file for complete search history.

(56) References Cited

U.S. PATENT DOCUMENTS

| | | | |
|---|---|---|---|
| 3,691,140 A * | 9/1972 | Silver ......................... | 526/240 |
| 3,875,099 A * | 4/1975 | Kurth et al. ................. | 523/305 |
| 5,053,436 A * | 10/1991 | Delgado ...................... | 521/64 |
| 5,453,470 A * | 9/1995 | Kasai et al. .................. | 526/64 |
| 5,514,435 A * | 5/1996 | Suzuki et al. ............... | 428/41.5 |

FOREIGN PATENT DOCUMENTS

JP    58104974    *    6/1983

* cited by examiner

*Primary Examiner*—Bernard Lipman
(74) *Attorney, Agent, or Firm*—Lathrop & Gage LC

(57) ABSTRACT

In forming pressure sensitive adhesive microspheres by copolymerizing a non-ionic monomer of an alkyl acrylate or alkyl methacrylate ester of a non-tertiary alcohol and an acid monomer copolymerizable with said non-ionic monomer, an electrolyte is present during the polymerization to promote formation of solid rather than hollow microspheres.

48 Claims, No Drawings

PROCESS FOR FORMING SOLID PRESSURE SENSITIVE ADHESIVE POLYMER MICROSPHERES

RELATED APPLICATIONS

This application is a nonprovisional application which claims the priority of prior provisional applications Serial No. 60/332,305, filed Nov. 13, 2001, the disclosures of which are incorporated herein by reference.

BACKGROUND OF THE INVENTION

This invention relates to a process for forming pressure sensitive polymeric microspheres, and to the solid microspheres so formed as well as their use as repositionable pressure sensitive adhesives.

Solid and hollow inherently tacky acrylate polymer microspheres are known in the art for use in repositionable pressure sensitive adhesive applications. The term "repositionable" refers to the ability to be repeatedly adhered to and removed from a substrate without substantial loss of adhesion capability.

U.S. Pat. No. 3,691,140 to Silver discloses preparation of such microspheres utilizing water soluble, substantially oil insoluble ionic monomers as components of the acrylate polymer. Amongst others of such monomers are disclosed sodium acrylate, sodium methacrylate, and ammonium acrylate. Subsequent U.S. Pat. No. 5,053,436 to Delgado discloses that the Silver '140 patent teaches that such water soluble, substantially oil insoluble ionic monomers are critical to preventing coagulation or agglomeration of the formed microspheres.

U.S. Pat. No. 5,053,436 discloses preparation of hollow, inherently tacky, acrylate polymer microspheres by aqueous suspension polymerization of at least one alkyl acrylate or alkyl methacrylate ester monomer and at least one non-ionic or moderately ionized polar monomer.

With respect to microsphere loss during repositioning, microspheres are transferred from the carrier or backing layer to the substrate. When microspheres are pulled away from the carrier or backing layer, this is recognized as a post synthesis application problem in the art. Limited or no microsphere transfer is desirable in order that the carrier or backing layer be able to stick to another surface after repositioning.

Many approaches are disclosed in the art to minimize microsphere adhesive transfer. These include use of special emulsifiers during a two step polymerization procedure to promote formation of hollow microspheres; use of special fine particles interspersed with the microspheres; coating the microspheres with a separate adhesive layer; use of a special adhesion-promoting co-monomer during polymerization formation of the microspheres; use of a binder material providing sockets in which the microspheres are mechanically held; use of a primer applied to the carrier or backing layer, etc.

A further need continues to exist in the art for techniques to improve the adhesive transfer performance property of inherently tacky acrylate pressure sensitive adhesive microspheres.

SUMMARY OF THE INVENTION

Now, a process has been developed providing solid (as opposed to hollow) acrylate polymer microspheres having improved transfer performance characteristics.

Accordingly, a principle object of this invention is to provide a process for forming polymeric acrylate microspheres that improves the adhesion performance property of solid acrylate polymer microspheres.

Other objects of this invention will in part be obvious and will in part appear from the following detailed description and claims.

According to the invention, a process for preparing solid polymeric pressure sensitive adhesive microspheres is provided comprising (a) contacting a polymerizable aqueous emulsion of at least one non-ionic monomer of an alkyl acrylate or alkyl methacrylate ester of a non-tertiary alcohol and at least one acid monomer copolymerizable with the non-ionic monomer, and at least one electrolyte selected from alkali metal, alkaline earth metal, or ammonium salts of inorganic or organic acids having a $K_a$ equal to or greater than the $K_a$ of acetic acid, and (b) polymerizing the emulsion to form an aqueous suspension of the solid polymeric pressure sensitive adhesive microspheres; wherein an effective amount of the electrolyte is contacted with the polymerizable aqueous emulsion prior to the start of polymerization.

Still further according to the invention, solid polymeric pressure sensitive adhesive microspheres produced by the process described above are provided.

BRIEF DESCRIPTION OF THE DRAWINGS

Not Applicable

DETAILED DESCRIPTION OF THE INVENTION

This invention provides solid polymeric microspheres useful as repositionable pressure sensitive adhesives in the production of removable and repositionable products such as labels, note paper, tapes and the like. The solid polymeric microspheres of the invention may be applied directly to paper or other backings. As used herein, the term "solid" means microspheres containing essentially no interior voids or internal cavities having a diameter greater than 10% of the diameter of the microsphere, although there may be a detectable number of hollow or hollow-appearing microspheres in the overall microsphere product produced by the process of the invention.

A first embodiment of the invention relates to a suspension polymerization process for preparing solid polymeric pressure sensitive adhesive microspheres comprising (a) contacting a polymerizable aqueous emulsion of at least one non-ionic monomer of an alkyl acrylate or alkyl methacrylate ester of a non-tertiary alcohol and at least one acid monomer copolymerizable with the non-ionic monomer, and at least one electrolyte selected from alkali metal, alkaline earth metal, or ammonium salts of inorganic or organic acids having a $K_a$ equal to or greater than the $K_a$ of acetic acid, and (b) polymerizing the emulsion to form an aqueous suspension of the solid polymeric pressure sensitive adhesive microspheres; wherein an effective amount of the electrolyte is contacted with the polymerizable aqueous emulsion prior to the start of polymerization.

According to the first embodiment of the invention, the polymerizable aqueous emulsion can be prepared by contacting water, at least one non-ionic monomer of an alkyl acrylate or alkyl methacrylate ester of a non-tertiary alcohol, at least one acid monomer copolymerizable with the non-ionic monomer, and an emulsifier.

Non-ionic monomers that can be employed according to the invention include alkyl acrylate or alkyl methacrylate esters of a non-tertiary alcohol. The alkyl groups of the alkyl acrylate or alkyl methacrylate monomers are linear or branched alkyl radicals having from 4 to about 14 carbon atoms, preferably from 4 to about 10 carbon atoms, and more preferably from 4 to about 8 carbon atoms. Such acrylates and methacrylates are oleophilic, water emulsifiable, have restricted water solubility, and as homopolymers, generally have glass transition temperatures below about −20° C. Examples of this class of monomers include, but are not limited to, isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and the like, singly or in mixtures.

The currently preferred non-ionic monomers are 2-ethylhexyl acrylate, n-butyl acrylate, and mixtures thereof, with 2-ethylhexyl acrylate being most preferred.

Acid monomers that can be employed according to the invention are acid monomers that are copolymerizable with the non-ionic monomer and that are water soluble and substantially oil-insoluble. By substantially oil-insoluble and water-soluble it is meant that the monomer has a solubility of less than 0.5% by weight and, a distribution ratio (D) at a given temperature (preferably 50°–65° C.), of solubility in the oil phase monomer to solubility in the aqueous phase of less than about 0.005, i.e., $$D = \frac{\text{Total concentration in organic layer}}{\text{Total concentration in aqueous layer}}$$

Such acid monomers are acids selected from monoolefinic monocarboxylic acids, monoolefinic dicarboxylic acids, or mixtures thereof. The number of carbon atoms in the monoolefinic monocarboxylic acids or the monoolefinic dicarboxylic acids of the invention can vary as long as the acid monomer is copolymerizable with the non-ionic monomer and is water soluble and substantially oil-insoluble.

Examples of suitable acid monomers include, but are not limited to, acrylic acid, methacrylic acid, maleic acid, itaconic acid, crotonic acid and mixtures thereof. The currently preferred acids are acrylic acid and methacrylic acid, with acrylic acid being most preferred.

The composition of the copolymer microspheres of the invention can be expressed in terms of the amounts of non-ionic monomer and acid monomer charged to the polymerization. The amount of non-ionic and acid monomers charged can be expressed in terms of weight percent based on the total monomer charged to the polymerization. Broadly, the monomer charged will contain about 85 to about 99.5 weight percent non-ionic monomer and about 0.5 to about 15 weight percent acid monomer, preferably about 90 to about 99.5 weight percent non-ionic monomer and about 0.5 to about 10 weight percent acid monomer, and more preferably about 94 to about 98 weight percent non-ionic monomer and about 2 to about 6 weight percent acid monomer.

Electrolytes that can be employed according to the invention include any of the numerous alkali metal, alkaline earth metal, or ammonium salts of organic or inorganic acids known in the art which are strong enough electrolytes to produce the solid polymeric pressure sensitive adhesive microspheres of the invention having improved adhesion performance, i.e. the acids should have a $K_a$ equal to or greater than the $K_a$ of acetic acid or a $pK_a$ equal to or less than the $pK_a$ of acetic acid (acetic acid: $K_a=1.75\times10^{-5}$ and $pK_a=4.756$). Examples of suitable inorganic acids include, but are not limited to, hydrochloric acid, hydrobromic acid, hydriodic acid, sulfuric acid, nitric acid, or mixtures thereof. Examples of suitable organic acids include, but are not limited to, acetic acid, formic acid, oxalic acid, or mixtures thereof. Typically, inorganic acids are preferred. Currently, the preferred inorganic acids are sulfuric acid, and hydrochloric acid, with sulfuric acid being most preferred due to the excellent results achieved therewith. The preferred salts are the alkali metal salts, with the sodium salts being most preferred due to the excellent results achieved therewith.

Examples of suitable electrolytes include, but are not limited to, sodium sulfate, sodium halide, sodium nitrate, sodium acetate, sodium formate, ammonium sulfate, ammonium nitrate, ammonium halide, ammonium acetate, potassium sulfate, potassium halide, magnesium sulfate, and magnesium halide, and the like, and mixtures thereof, wherein halide is chloride, bromide and iodide. The currently preferred electrolytes are sodium sulfate, sodium halide (particularly sodium chloride), and sodium nitrate, with sodium sulfate being most preferred due to the excellent results achieved therewith.

The amount of electrolyte used in the polymerization is that amount necessary to enable production of the solid, inherently tacky acrylate polymer microspheres of the invention, and will depend on the strength of the electrolyte and will vary based on the specific electrolyte selected. The required amount of electrolyte can be readily determined by those skilled in the art without undue experimentation. The amount of electrolyte used in the polymerization can be expressed as a weight ratio of electrolyte to acid monomer. For example, when sodium sulfate is the electrolyte, the weight ratio of sodium sulfate to acid monomer can be from about 0.2:1 to about 3:1, preferably about 0.25:1 to about 2:1, and more preferably about 0.5:1 to about 1.5:1.

At least an amount of the electrolyte is added prior to the start of polymerization. The amount of electrolyte added prior to the start of polymerization is an affective amount, i.e. the amount effective to produce the solid, inherently tacky acrylate polymer microspheres of the invention.

The polymerization reaction can be conducted in any conventional reaction vessel capable of a suspension polymerization.

The process of the invention utilizes at least one emulsifier in a concentration greater than the critical micelle concentration, defined as that minimum emulsifier concentration necessary for the formation of micelles. This concentration is slightly different for each emulsifier, usable concentrations typically ranging from about 0.0001 to about 3.0 moles/liter.

Emulsifiers, i.e. surfactants, that can be employed according to the invention include anionic, nonionic, cationic, amphoteric emulsifiers and mixtures thereof. Anionic emulsifiers are currently preferred. Examples of suitable anionic emulsifiers include, but are not limited to, alkyl aryl sulfonates (e.g. sodium dodecylbenzene sulfonate), alkyl sulfates (e.g. sodium dodecyl sulfate, ammonium dodecyl sulfate), sulfates of ethoxylated alcohols (e.g. sodium lauryl ether sulfate), sulfates and sulfonates of ethoxylated alkylphenols (e.g. sodium salt of alkylaryl polyether sulfonates), sulfosuccinates (e.g. sodium dioctyl sulfosuccinate), diphenyl sulfonates (e.g. sodium dodecyl diphenyloxide disulfonate), and mixtures thereof. Examples of suitable nonionic emulsifiers include, but are not limited to, ethoxylated alcohols (e.g. ethoxylated oleyl alcohol), ethoxylated alkylphenols (e.g. nonylphenol ethoxylate), and mixtures thereof. Examples of suitable cationic emulsifiers include, but are not limited to, ethoxylated fatty amines (e.g. ethoxylated tallow amine).

The process of the invention also utilizes at least one oil-soluble, very low water soluble polymerization initiator. Oil-soluble, substantially water insoluble polymerization initiators are those which are normally acceptable for free radical polymerization of acrylate monomers and are well known in the art. The typical concentration of oil-soluble, substantially water insoluble polymerization initiators is about 0.1 weight percent to about 10 weight percent, preferably about 0.1 weight percent to about 5 weight percent of the total weight of the non-ionic and ionic monomers charged to the polymerization.

Oil-soluble, substantially water insoluble polymerization initiators that can be employed according to the invention include azo compounds, peroxides, and the like, and mixtures thereof. Examples of azo compounds include, but are not limited to, 2,2'-azobisisobutyronitrile (VAZO 64 from E. I. duPont de Nemours and Company), 2,2'-azobis(2-methylbutyronitrile) (VAZO 67 from E. I. duPont de Nemours and Company), and mixtures thereof. Examples of peroxides include, but are not limited to, benzoyl peroxide (Cadet BPO from Akzo Nobel Chemicals Inc.), di-(2-ethylhexyl) peroxydicarbonate (Trigonox EHP from Akzo Nobel Chemicals Inc.), and mixtures thereof.

The oil-soluble, substantially water insoluble polymerization initiator can be added to the polymerizable aqueous emulsion before or after the electrolyte is contacted with the polymerizable aqueous emulsion. It is currently preferred that the oil-soluble, substantially water insoluble polymerization initiator be added and polymerization initiated after contacting the electrolyte with the polymerizable aqueous emulsion.

The polymerization can be initiated by any conventional method known to those skilled in the art, such as by application of heat or radiation. The method of initiation will be dependent on the oil-soluble, substantially water insoluble polymerization initiator used and will be readily apparent to those skilled in the art.

Water is used to prepare the polymerizable aqueous emulsion utilized in the process of the invention. While not required, it is currently preferred to use water having low ionic content.

The polymerization temperature will be dependent on the choice of oil-soluble, substantially water insoluble polymerization initiator and the method of initiation, and will be readily apparent to those skilled in the art. For example, when benzoyl peroxide is used as the oil-soluble, substantially water insoluble polymerization initiator, the polymerization temperature is typically in the range of about 60° C. to about 90° C.

The polymerization time is that time needed to achieve the desired conversion based on the other reaction conditions, e.g. temperature profile, and reaction components, e.g. monomers, initiator, etc. The polymerization time will be readily apparent to those skilled in the art.

The polymerization is preferably conducted at atmospheric pressure under an inert atmosphere. Suitable inert gases include nitrogen, argon, carbon dioxide, helium, krypton, xenon, and neon, with nitrogen being preferred. However, the polymerization can be conducted at elevated pressure if desired. While the polymerization could be conducted under an oxygen-containing atmosphere, this is not preferred since the presence of oxygen inhibits polymerization. If the polymerization mixture contains oxygen, it must be expelled or consumed before the polymerization reaction can initiate.

Following polymerization, the aqueous suspension of copolymer microspheres is stable to agglomeration or coagulation under room temperature conditions. The copolymer microsphere suspensions typically have solids content of from about 10 to about 50 weight percent, preferably about 20 to about 40 weight percent.

Shear, as induced by agitation, is used to effectively control particle size. It is presently preferred that sufficient shear be induced to provide microspheres having an average particle size smaller than about 200 µm, preferably smaller than about 100 µm, and more preferably about 15 µm to about 50 µm. When the level of shear is too high, there is tendency for the formed particles to be so fine that on application to a substrate at moderate coat weights it will perform like a continuous film. If the microspheres are too small, higher adhesions and adhesion buildup occurs. If shear is too low, particles of too great a size will be formed. If the microspheres are too large, increased adhesive transfer occurs. Preferably shear rates sufficient to provide microspheres having average particle size smaller than about 200 µm should be used.

Any conventional recovery technique known to those of skill in the art can be utilized to recover the microspheres of the invention or the aqueous dispersion of microspheres can be used directly from the final polymerization reaction mixture. It is currently preferred to directly use the aqueous dispersion of microspheres from the final polymerization reaction mixture to provide inherently tacky pressure sensitive adhesive microspheres.

EXAMPLES

Test Methods

Sample Preparation

Each of the experimental suspension batches were coated directly onto the dull side of 60# Kromekote paper. Each casting was dried immediately in a 90° C. circulating oven for 5 minutes and closed to release liner. The coatweight of each sample was measured. The targeted coatweight was 0.6±0.1 mils. The castings were conditioned in a constant temperature and humidity room (72±2° F., 50±2% RH) for one hour prior to testing. Two sample strips, 1"×11", were cut from each casting.

Peel Adhesion

Peel adhesion is the force required to remove a coated flexible sheet material from a test panel measured at a specific angle and rate of removal. In the examples, this force was expressed in pounds per inch width of coated sheet. The procedure was as follows.

A strip 1.0 inch in width of the coated paper sheet was applied to the horizontal surface of the shiny side of 60# Kromekote paper 'panels' with 5.5 lineal inches in firm contact with the surface. A four pound rubber roller was used to apply each strip to the paper 'panels'. The roller passed twice over each strip at a rate of 12 inches per minute. The strips were allowed to wet out the surface for twenty minutes prior to testing. The free end of the coated strip was doubled back nearly touching itself so that the angle of removal was 180°. The free end of the strip was clamped into the moving jaw of the Instron Model 1125 test machine while the paper test 'panel' backed with a stainless steel test panel was securely clamped in the stationary jaw of the Instron. The strip was removed from the panel at a rate of 12 inches per minute. The scale reading in pounds was recorded as the sample strip was peeled from the panel surface. The data was reported as the average of the range of numbers observed during the test.

Microsphere Transfer

The contact area between each strip and panel was visually inspected after each strip was removed from the panel. First, the panel was inspected for the presence of microspheres on its surface. If microspheres were present, the percent surface area of coverage was estimated. Finally, the coated surface of the paper strip was inspected for presence of microspheres. If microspheres remained on the coated surface, the percent microsphere transfer was adjusted to reflect the amount of microspheres remaining on the coated paper surface. A rating of 100 percent microsphere transfer indicated that none of the microspheres remained on the coated surface, whereas, a rating of zero percent microsphere transfer indicated that none of the microspheres were found on the test panel surface. Ratings in between these two values indicated that there was some level of microsphere transfer to the test panel. One of the objects of the invention is to minimize the microsphere transfer to the test panel surface.

| Abbreviations and Tradenames | |
|---|---|
| SDS: | sodium dodecyl sulfate; Rhodapon SB (30% solids solution) from Rhodia |
| ADS: | ammonium dodecyl sulfate; Rhodapon L-22 (28% solids solution) from Rhodia |
| BPO: | benzoyl peroxide; Cadet BPO-78 (78% active) from Akzo Nobel Chemicals Inc. |
| NH$_4$OH: | Ammonium hydroxide (28%); Sigma-Aldrich Co. |
| NaOH: | Sodium hydroxide (15%); Fisher Scientific |
| NH$_4$OAC: | Ammonium acetate; Sigma-Aldrich Co. |
| Na$_2$SO$_4$: | Sodium sulfate; Sigma-Aldrich Co. |
| AA: | Acrylic acid; Sigma-Aldrich Co. |
| 2-EHA: | 2-Ethylhexyl acrylate; Sigma-Aldrich Co. |

Example 1 (Control)

U.S. Pat. No. 3,691,140

A two liter resin reactor equipped with a mechanical stirrer, a condenser, a thermocouple probe and a gas inlet port was charged with a solution of 740 grams of deionized water and 10 grams of acrylic acid (AA) neutralized with 10.8 grams of ammonium hydroxide (28%) to pH 8.0. In a separate container, 1.0 gram of benzoyl peroxide (BPO) was dissolved in 240 grams of 2-ethylhexyl acrylate (2-EHA) and then added to the reactor. The agitation was set at 320 rpm. The solution was purged with nitrogen for fifteen minutes after which the nitrogen line was repositioned above the fluid for the remainder of the reaction. Finally, 10 grams of SDS were added to the reactor. After 15 minutes of mixing, the reaction mixture was heated to 65° C. and held for the first hour. At a heating rate of approximately 2.2° C. per minute, the reaction became exothermic after 20 minutes and subsided after approximately another 20 minutes. The reaction mixture was then heated to 77° C. and held for the next two hours and then heated to 88° C. and held for the final two hours.

The reaction mixture was subsequently cooled to room temperature and filtered through a 400 micron nylon mesh filter. Very little coagulum was found to be present. The twenty minute peel performance (PL20) on 60# Kromekote paper was 0.35 lbs./in. with 100% bead transfer.

Example 2 (Control)

U.S. Pat. No. 5,053,436

A two liter resin reactor equipped with a mechanical stirrer, a condenser, a thermocouple probe and a gas inlet port was charged with 744 grams of deionized water and 10 grams of AA. In a separate container, 1.07 grams of BPO was dissolved in 240 grams 2-EHA and then added to the reactor. The agitation was set at 320 rpm. The solution was purged with nitrogen for fifteen minutes after which the nitrogen line was repositioned above the fluid for the remainder of the reaction. Finally, 8.9 grams ADS were added to the reactor. The pH of the reaction mixture was 2.6. After 15 minutes of mixing, the reaction mixture was heated to 65° C. for the first hour, to 77° C. for the next two hours, and to 88° C. for the final two hours. The reaction was cooled to room temperature and filtered through a 400 micron nylon mesh filter. Very little coagulum was found to be present. The particle morphology was hollow microspheres.

The twenty minute peel performance (PL20) on 60# Kromekote paper was 0.39 lbs./in. with 0% bead transfer.

Example 3

A two liter resin reactor equipped with a mechanical stirrer, a condenser, a thermocouple probe and a gas inlet port was charged with 744 grams of deionized water, 10.1 grams of sodium sulfate, and 10 grams of AA. In a separate container, 1.07 grams of BPO was dissolved in 240 grams of 2-EHA and then added to the reactor. The agitation was set at 320 rpm. The solution was purged with nitrogen for fifteen minutes after which the nitrogen line was repositioned above the fluid for the remainder of the reaction. Finally, 8.9 grams ADS were added to the reactor. The pH of the reaction mixture was 2.6. After 15 minutes of mixing, the reaction mixture was heated to 65° C. for the first hour, to 77° C. for the next two hours, and to 88° C. for the final two hours. The reaction was cooled to room temperature and filtered through a 400 micron nylon mesh filter. Very little coagulum was found to be present. The particle morphology was solid microspheres.

The twenty minute peel performance (PL20) on 60# Kromekote paper was 0.45 lbs./in. with 0% bead transfer.

Example 4

A two liter resin reactor equipped with a mechanical stirrer, a condenser, a thermocouple probe and a gas inlet port was charged with 744 grams of deionized water, 10.1 grams of ammonium acetate, and 10 grams of AA. In a separate container, 1.07 grams of BPO was dissolved in 240 grams of 2-EHA and then added to the reactor. The agitation was set at 320 rpm. The solution was purged with nitrogen for fifteen minutes after which the nitrogen line was repositioned above the fluid for the remainder of the reaction. Finally, 8.9 grams ADS were added to the reactor. The pH of the reaction mixture was 4.4. After 15 minutes of mixing, the reaction mixture was heated to 65° C. for the first hour, to 77° C. for the next two hours, and to 88° C. for the final two hours. The reaction was cooled to room temperature and filtered through a 400 micron nylon mesh filter. Very little coagulum was found to be present. The particle morphology was solid microspheres.

The twenty minute peel performance (PL20) on 60# Kromekote paper was 0.62 lbs./in. with 50% bead transfer.

Example 5

A two liter resin reactor equipped with a mechanical stirrer, a condenser, a thermocouple probe and a gas inlet port was charged with 744 grams of deionized water, 7.5 grams of sodium sulfate, and 10 grams of AA. In a separate container, 1.07 grams of BPO was dissolved in 240 grams of 2-EHA and then added to the reactor. The agitation was set at 320 rpm. The solution was purged with nitrogen for fifteen minutes after which the nitrogen line was repositioned above the fluid for the remainder of the reaction. Finally, 8.9 grams ADS were added to the reactor. The pH of the reaction mixture was 2.8. After 15 minutes of mixing, the reaction mixture was heated to 65° C. for the first hour, to 77° C. for the next two hours, and to 88° C. for the final two hours. The reaction was cooled to room temperature and filtered through a 400 micron nylon mesh filter. Very little coagulum was found to be present. The particle morphology was solid microspheres.

The twenty minute peel performance (PL20) on 60# Kromekote paper was 0.48 lbs./in. with 0% bead transfer.

Example 6

A two liter resin reactor equipped with a mechanical stirrer, a condenser, a thermocouple probe and a gas inlet port was charged with 744 grams of deionized water, 5 grams of sodium sulfate, and 10 grams of AA. In a separate container, 1.07 grams of BPO was dissolved in 240 grams of 2-EHA and then added to the reactor. The agitation was set at 320 rpm. The solution was purged with nitrogen for fifteen minutes after which the nitrogen line was repositioned above the fluid for the remainder of the reaction. Finally, 8.9 grams ADS were added to the reactor. The pH of the reaction mixture was 2.5. After 15 minutes of mixing, the reaction mixture was heated to 65° C. for the first hour, to 77° C. for the next two hours, and to 88° C. for the final two hours. The reaction was cooled to room temperature and filtered through a 400 micron nylon mesh filter. Very little coagulum was found to be present. The particle morphology was solid microspheres with very slight porosity.

The twenty minute peel performance (PL20) on 60# Kromekote paper was 0.39 lbs./in. with 0% bead transfer.

Example 7

A two liter resin reactor equipped with a mechanical stirrer, a condenser, a thermocouple probe and a gas inlet port was charged with 744 grams of deionized water, 2.5 grams of sodium sulfate, and 10 grams of AA. In a separate container, 1.07 grams of BPO was dissolved in 240 grams of 2-EHA and then added to the reactor. The agitation was set at 320 rpm. The solution was purged with nitrogen for fifteen minutes after which the nitrogen line was repositioned above the fluid for the remainder of the reaction. Finally, 8.9 grams ADS were added to the reactor. The pH of the reaction mixture was 2.7. After 15 minutes of mixing, the reaction mixture was heated to 65° C. for the first hour, to 77° C. for the next two hours, and to 88° C. for the final two hours. The reaction was cooled to room temperature and filtered through a 400 micron nylon mesh filter. Very little coagulum was found to be present. The particle morphology was solid microspheres with very slight porosity.

The twenty minute peel performance (PL20) on 60# Kromekote paper was 0.57 lbs./in. with 0% bead transfer.

The results of Examples 1–7 are summarized in Table 1.

TABLE 1

| Example | Particle Morphology | PL20 Paper (lb./in.) | Bead Transfer (%) |
|---|---|---|---|
| 1 (control) | Solid | 0.35 | 100 |
| 2 (control) | Hollow | 0.39 | 0 |
| 3 (invention) | Solid | 0.45 | 0 |
| 4 (invention) | Solid | 0.62 | 50 |
| 5 (invention) | Solid | 0.48 | 0 |
| 6 (invention) | Solid [a] | 0.39 | 0 |
| 7 (invention) | Solid [a] | 0.57 | 0 |

[a] Solid microspheres containing very slight porosity.

The results of Examples 3–7 compared to Example 1 clearly demonstrate that the process of the invention produces solid polymer microspheres having significantly improved microsphere adhesive transfer. The results of Examples 3–7 compared to Example 2 clearly demonstrate that the use of the electrolyte in the process of the invention produces the desired solid microspheres whereas omitting the electrolyte results in hollow microspheres. The results of Examples 3 and 5–7 compared to Example 4 demonstrate that use of a stronger electrolyte, e.g. sodium sulfate, is preferred due to reduction of the microsphere adhesive transfer compared to the use of a weaker electrolyte, e.g. ammonium acetate.

We claim:

1. A process for preparing solid polymeric pressure sensitive adhesive microspheres comprising:
   (a) contacting a polymerizable aqueous emulsion of at least one non-ionic monomer of an alkyl acrylate or alkyl methacrylate ester of a non-tertiary alcohol and at least one acid monomer copolymerizable with said non-ionic monomer and at least one strong electrolyte selected from alkali metal, alkaline earth metal, or ammonium salts of inorganic or organic acids having a $K_a$ equal to or greater than the $K_a$ of acetic acid,; and
   (b) polymerizing the emulsion to form an aqueous suspension of said solid polymeric pressure sensitive adhesive microspheres;
   wherein at least an amount of said strong electrolyte effective to produce polymeric pressure sensitive adhesive solid microspheres is contacted with the polymerizable aqueous emulsion prior to the start of polymerization,
   wherein said process utilizes at least one emulsifier in a concentration greater than the critical micelle concentration; and
   wherein said solid polymeric microspheres have improved adhesion performance characteristics.

2. The process of claim 1 wherein the alkyl group of said non-ionic monomer has from 4 to about 14 carbon atoms.

3. The process of claim 2 wherein said non-ionic monomer is selected from 2-ethyl hexyl acrylate or n-butyl acrylate.

4. The process of claim 1 wherein said acid monomer is an acid selected from a monoolefinic monocarboxylic acid, a monoolefinic dicarboxylic acid or mixtures thereof.

5. The process of claim 4 wherein said acid monomer is acrylic acid or methacrylic acid.

6. The process of claim 5 wherein said acid monomer is acrylic acid.

7. The process of claim 1 wherein said strong electrolyte is selected from an alkali metal, alkaline earth metal, or ammonium salt of an inorganic acid.

8. The process of claim 7 wherein said inorganic acid is selected from sulfuric acid, hydrochloric acid, hydrobromic acid, hydriodic acid, nitric acid, or mixtures thereof.

9. The process of claim 8 wherein said inorganic acid is selected from sulfuric acid, hydrochloric acid, or mixtures thereof.

10. The process of claim 7 wherein said strong electrolyte is an alkali metal or ammonium salt.

11. The process of claim 10 wherein said strong electrolyte is an alkali metal salt.

12. The process of claim 11 wherein said strong electrolyte is a sodium salt.

13. The process of claim 12 wherein said strong electrolyte is selected from sodium sulfate or sodium chloride.

14. The process of claim 7 wherein said strong electrolyte is an alkali metal salt.

15. The process of claim 14 wherein said strong electrolyte is a sodium salt.

16. The process of claim 7 wherein said strong electrolyte is an alkali metal, alkaline earth metal, or ammonium salt of an organic acid and said organic acid is selected from acetic acid, formic acid, oxalic acid, or mixtures thereof.

17. The process of claim 16 wherein said organic acid is acetic acid.

18. The process of claim 16 wherein said strong electrolyte is an alkali metal or ammonium salt.

19. The process of claim 18 wherein said strong electrolyte is an alkali metal salt.

20. The process of claim 19 wherein said strong electrolyte is a sodium salt.

21. The process of claim 18 wherein said strong electrolyte is sodium acetate or ammonium acetate.

22. A solid polymeric pressure sensitive adhesive microspheres produced by the process of any of claims 1–21.

23. A process for preparing solid polymeric pressure sensitive adhesive microspheres comprising:
(a) contacting a polymerizable aqueous emulsion of 2-ethylhexyl acrylate and acrylic acid, and a strong electrolyte selected from sodium sulfate or ammonium acetate; and
(b) polymerizing the emulsion to form an aqueous suspension of said solid polymeric pressure sensitive adhesive microspheres;
wherein at least an amount of said strong electrolyte effective to produce polymeric pressure sensitive adhesive solid microspheres is contacted with the polymerizable aqueous emulsion prior to the start of polymerization, and
wherein said process utilizes at least one emulsifier in a concentration greater than the critical micelle concentration; and
wherein said solid polymeric microspheres have improved adhesion performance characteristics.

24. The process of claim 23 wherein said strong electrolyte is sodium sulfate.

25. A process for preparing solid polymeric pressure sensitive adhesive microspheres comprising:
(a) contacting a polymerizable aqueous emulsion of at least one non-ionic monomer of an alkyl acrylate or alkyl methacrylate ester of a non-tertiary alcohol and at least one acid monomer copolymerizable with said non-ionic monomer and at least one strong electrolyte selected from alkali metal, alkaline earth metal, or ammonium salts of inorganic or organic acids having a $K_a$ equal to or greater than the $K_a$ of acetic acid,; and
(b) polymerizing the emulsion to form an aqueous suspension of said solid polymeric pressure sensitive adhesive microspheres;
wherein an amount of said strong electrolyte ranging from 0.2:1 to 3:1 by weight of the acid monomer (weight of electrolyte to weight of acid monomer) is contacted with the polymerizable aqueous emulsion prior to the start of polymerization to provide the solid polymeric pressure sensitive adhesive microspheres;
wherein said process utilizes at least one emulsifier in a concentration greater than the critical micelle concentration; and
wherein said solid polymeric microspheres have improved adhesion performance characteristics.

26. The process of claim 25 wherein the alkyl group of said non-ionic monomer has from 4 to about 14 carbon atoms.

27. The process of claim 26 wherein said non-ionic monomer is selected from 2-ethyl hexyl acrylate or n-butyl acrylate.

28. The process of claim 25 wherein said acid monomer is an acid selected from a monoolefinic monocarboxylic acid, a monoolefinic dicarboxylic acid or mixtures thereof.

29. The process of claim 28 wherein said acid monomer is acrylic acid or methacrylic acid.

30. The process of claim 29 wherein said acid monomer is acrylic acid.

31. The process of claim 25 wherein said strong electrolyte is selected from an alkali metal, alkaline earth metal, or ammonium salt of an inorganic acid.

32. The process of claim 31 wherein said inorganic acid is selected from sulfuric acid, hydrochloric acid, hydrobromic acid, hydriodic acid, nitric acid, or mixtures thereof.

33. The process of claim 32 wherein said inorganic acid is selected from sulfuric acid, hydrochloric acid, or mixtures thereof.

34. The process of claim 32 wherein said strong electrolyte is an alkali metal or ammonium salt.

35. The process of claim 34 wherein said strong electrolyte is an alkali metal salt.

36. The process of claim 35 wherein said strong electrolyte is a sodium salt.

37. The process of claim 36 wherein said strong electrolyte is selected from sodium sulfate or sodium chloride.

38. The process of claim 31 wherein said electrolyte is an alkali metal salt.

39. The process of claim 38 wherein said electrolyte is a sodium salt.

40. The process of claim 31 wherein said electrolyte is an alkali metal, alkaline earth metal, or ammonium salt of an organic acid and said organic acid is selected from acetic acid, formic acid, oxalic acid, or mixtures thereof.

41. The process of claim 40 wherein said organic acid is acetic acid.

42. The process of claim 40 wherein said strong electrolyte is an alkali metal or ammonium salt.

43. The process of claim 42 wherein said strong electrolyte is an alkali metal salt.

44. The process of claim 43 wherein said strong electrolyte is a sodium salt.

45. The process of claim 42 wherein said strong electrolyte is sodium acetate or ammonium acetate.

46. A solid polymeric pressure sensitive adhesive microspheres produced by the process of any of claims 25–45.

47. A process for preparing solid polymeric pressure sensitive adhesive microspheres comprising:
(a) contacting a polymerizable aqueous emulsion of 2-ethylhexyl acrylate and acrylic acid, and a strong electrolyte selected from sodium sulfate or ammonium acetate; and
(b) polymerizing the emulsion to form an aqueous suspension of said solid polymeric pressure sensitive adhesive microspheres;
wherein an amount of said strong electrolyte ranging from 0.2:1 to 3:1 by weight of the acid monomer (weight of strong electrolyte to weight of acid monomer) is contacted with the polymerizable aqueous emulsion prior to the start of polymerization to provide the solid polymeric pressure sensitive adhesive microspheres;
wherein said process utilizes at least one emulsifier in a concentration greater than the critical micelle concentration; and
wherein said solid polymeric microspheres have improved adhesion performance characteristics.

48. The process of claim 27 wherein said strong electrolyte is sodium sulfate.

* * * * *